United States Patent
Lavranchuk

(10) Patent No.: US 8,210,755 B2
(45) Date of Patent: Jul. 3, 2012

(54) IDENTIFIABLE FIBER OPTICS

(75) Inventor: James S. Lavranchuk, Hillsborough, NJ (US)

(73) Assignee: Alcatel Lucent, Paris (FR)

( * ) Notice: Subject to any disclaimer, the term of this patent is extended or adjusted under 35 U.S.C. 154(b) by 1059 days.

(21) Appl. No.: 11/618,257

(22) Filed: Dec. 29, 2006

(65) Prior Publication Data

US 2008/0159738 A1   Jul. 3, 2008

(51) Int. Cl.
*G02B 6/36* (2006.01)
*H04B 10/08* (2006.01)
*H04B 17/00* (2006.01)
*G08B 13/14* (2006.01)

(52) U.S. Cl. ............ 385/53; 385/76; 385/100; 385/139; 398/17; 340/572.1

(58) Field of Classification Search ............... 385/53, 385/100, 139, 76, 77, 135, 136, 137, 138, 385/123, 12; 398/17; 340/572.1
See application file for complete search history.

(56) References Cited

U.S. PATENT DOCUMENTS

| | | | |
|---|---|---|---|
| 6,784,802 B1* | 8/2004 | Stanescu | 340/687 |
| 6,808,116 B1* | 10/2004 | Eslambolchi et al. | 235/492 |
| 7,605,707 B2* | 10/2009 | German et al. | 340/572.8 |
| 7,760,094 B1* | 7/2010 | Kozischek et al. | 340/572.1 |
| 2003/0061393 A1* | 3/2003 | Steegmans et al. | 709/250 |
| 2003/0174048 A1* | 9/2003 | McCorkle | 340/10.34 |
| 2004/0125366 A1* | 7/2004 | Kiani et al. | 356/237.1 |
| 2005/0215119 A1* | 9/2005 | Kaneko | 439/607 |
| 2005/0224585 A1* | 10/2005 | Durrant et al. | 235/492 |
| 2005/0259930 A1* | 11/2005 | Elkins et al. | 385/100 |
| 2006/0153517 A1* | 7/2006 | Reagan et al. | 385/135 |
| 2006/0277324 A1* | 12/2006 | Aldereguia et al. | 710/1 |
| 2007/0013487 A1* | 1/2007 | Scholtz et al. | 340/10.41 |
| 2008/0150689 A1* | 6/2008 | Chiu et al. | 340/10.1 |
| 2008/0159738 A1* | 7/2008 | Lavranchuk | 398/17 |
| 2010/0178058 A1* | 7/2010 | Kozischek et al. | 398/115 |

* cited by examiner

*Primary Examiner* — Brian Healy
(74) *Attorney, Agent, or Firm* — Wall & Tong, LLP

(57) ABSTRACT

The present invention provides for an optical cable and methods for interconnecting modular components with optical fibers. Each optical fiber is electronically labeled with a unique serial number such that interconnections using the optical fibers can be accurately audited.

10 Claims, 6 Drawing Sheets

500

IDENTIFIABLE FIBER OPTICS

TECHNICAL FIELD

The invention relates to the field of optical telecommunications, and more particularly, to identifying specific fiber optic elements in groups of optical fibers.

BACKGROUND OF THE INVENTION

In fiber optic communication systems, networking elements are often constructed using modular components interconnected by optical fibers. In some cases optical fibers with special properties are employed to compensate for the linear and non-linear characteristics of an optical fiber path.

An interconnection between modular components is made by connecting (terminating) each end of an optical fiber at a respective modular component port. The connections are made by telecommunications craft workers, who typically use visual labels affixed to the fibers to help in identifying particular optical fibers so that they can be positioned correctly. Unfortunately, due to the large number and similarity of ports on modular components, termination of optical fiber at an incorrect port can easily occur.

It is known to terminate optical fibers at general purpose, wavelength indifferent port that is coupled to a wavelength selective switch. Optical signals received at such a port are then selectively coupled, via the wavelength selective switch, to a desired optical component within a network element. By terminating optical fibers in this manner, the element management system (EMS) controlling the network element may be used to control the operation of the wavelength selective switch to provide proper routing of optical signals. However, it is still necessary for telecommunications craft workers to identify each optical fiber and provide the identification information to the EMS to control thereby the wavelength selective switch.

SUMMARY OF THE INVENTION

The invention enables the automation of optical fiber identification by storing a cable identifier in an electronic labeling device within a cable terminator. The electronic labeling device, such as a semiconductor device or a radio frequency identification (RFID) device, is located within an optical fiber terminating device such as a connector at the end of an optical fiber. The cable identifier stored in the electronic labeling device is read by the circuitry of a network element port adapted to receive the connector. Thus, in one embodiment, an optical cable according to the invention includes an optical fiber having at least one end terminated with a connector including an electronic labeling device for storing a cable identifier.

In one embodiment of the invention, a network element includes a plurality of optical cable termination ports having circuitry adapted to read the above-described identifier such that a determination may be made of whether a correct optical cable is terminated at a particular port.

DETAILED DESCRIPTION

The invention is primarily described within the context of electronically labeling optical fibers. However, the present invention can be readily applied to any element for interconnecting components, such as modular components in a network. The electronic labels enable component identification and management of the optical fibers connected thereto. A discovery of connectivity process utilizes the electronic labels of the various interconnecting optical fiber to determine the interconnections between components. The discovery of connectivity process may be a centralized process using a network manager or a distributed process using, for example, controllers located within the interconnected components or modules.

Figure 1:
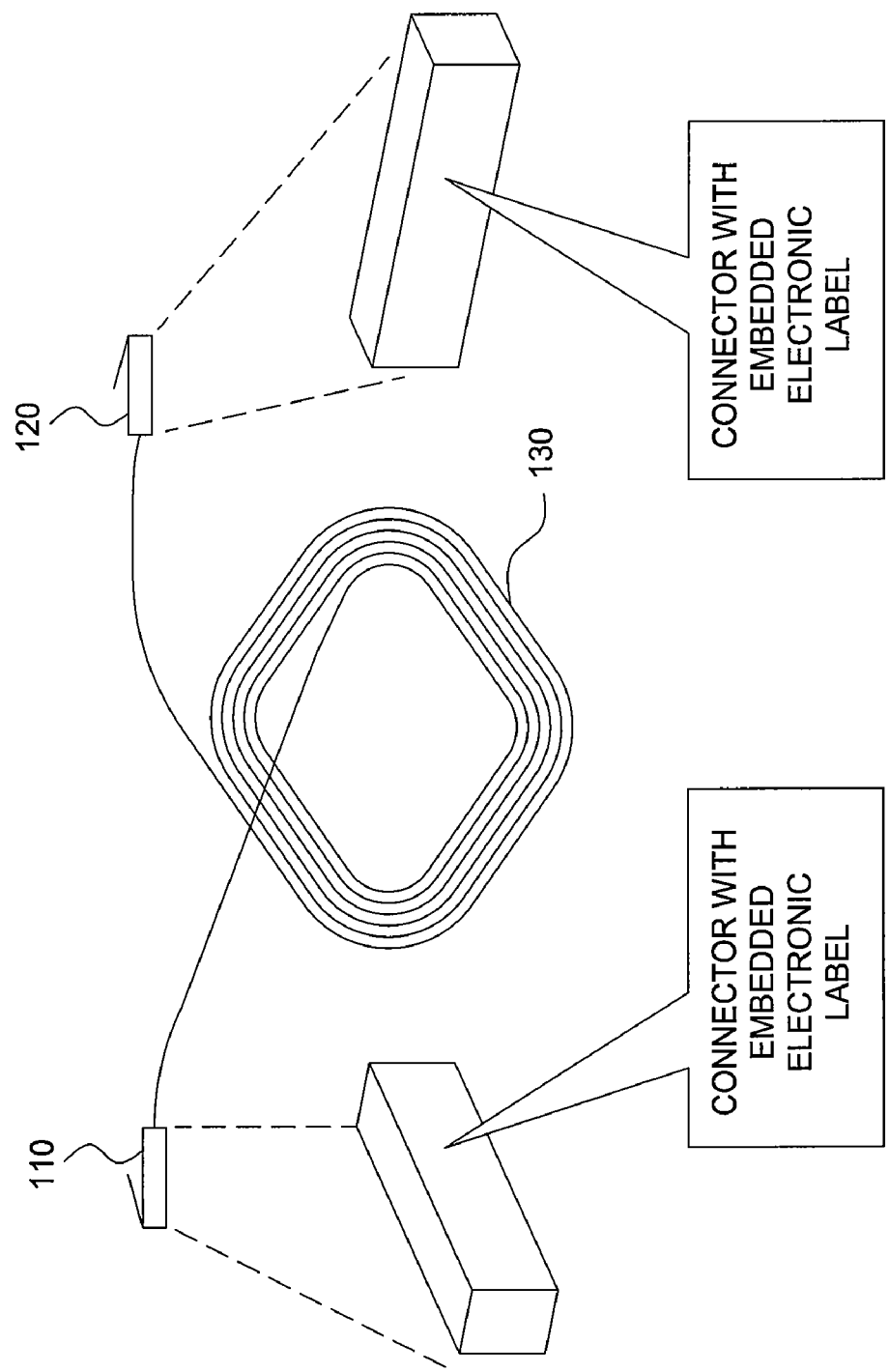
FIG. 1 depicts a high-level block diagram of an electronically labeled optical fiber according to one embodiment of the invention.

FIG. 1 depicts a high-level block diagram of an electronically labeled optical fiber cable according to one embodiment of the present invention. The electronically labeled optical fiber cable 100 of FIG. 1 comprises an optical fiber 130, having a proximal termination at a first connector 110 and a distal termination at a second connector 120.

The first connector 110 includes an embedded semiconductor device or other device containing (e.g., in a memory) an electronic label, illustratively a serial number (e.g., a numeric, alpha-numeric or other character string). The serial number preferably has sufficient digits to provide for a unique serial number for each interconnection deployed in typical fiber optical telecommunications equipment. In one embodiment, 128-bits, sixteen octet serial numbers are used (more or fewer bits may be used). Moreover, other unique coding schemes may be used to identify labeled optical fibers. Protection circuitry is optionally used to protect the information stored in the electronic label such that electrical and/or mechanical changes associated with connecting or disconnecting the optical cable connector do not erase the identifier or otherwise render the identifier unreadable. Protection circuitry comprises, illustratively, transient suppression circuitry, isolation circuitry and the like. The label can be embedded in connector without changing the physical dimensions, thereby allowing current standard connector systems to be enhanced and backward compatible.

In one embodiment, a semiconductor device powered by a receptacle is embedded in the material of a plug or connector terminating the optical fiber. One or more contacts in the receptacle mate with contacts on the plug to connect the semiconductor device embedded in the plug to a reader optionally located in the receptacle. In another embodiment, close proximity, wireless connections are used similar to the technology employed in smart cards and smart card readers (e.g., radio frequency identification tags and the like).

The second connector 120 includes an embedded electronic label that has the same serial number as the embedded electronic label in the first connector, though the connectors optionally use different labeling technology (e.g., RF identification tags in one connector and a semiconductor memory in the other). In another embodiment, each label includes extra characteristic information regarding the specific connection and/or the interconnected components. The extra characteristic information of the optical fiber (or optical fiber cable) embedded in the connector is further used to establish expected performance of the connection. High loss attenuation fibers, standard single mode fibers, negative dispersion characteristic fiber of various lengths, erbium doped fibers and others can all be distinguished by simply reading the label.

The first 110 and second 120 connectors provide terminations for the optical fiber 130. In one embodiment, the optical fiber or optical fiber connector includes components that compensate for linear and nonlinear distortions. The optical fiber may include other components to ensure quality of and facilitate the transmission of the optical signal.

Figure 2:
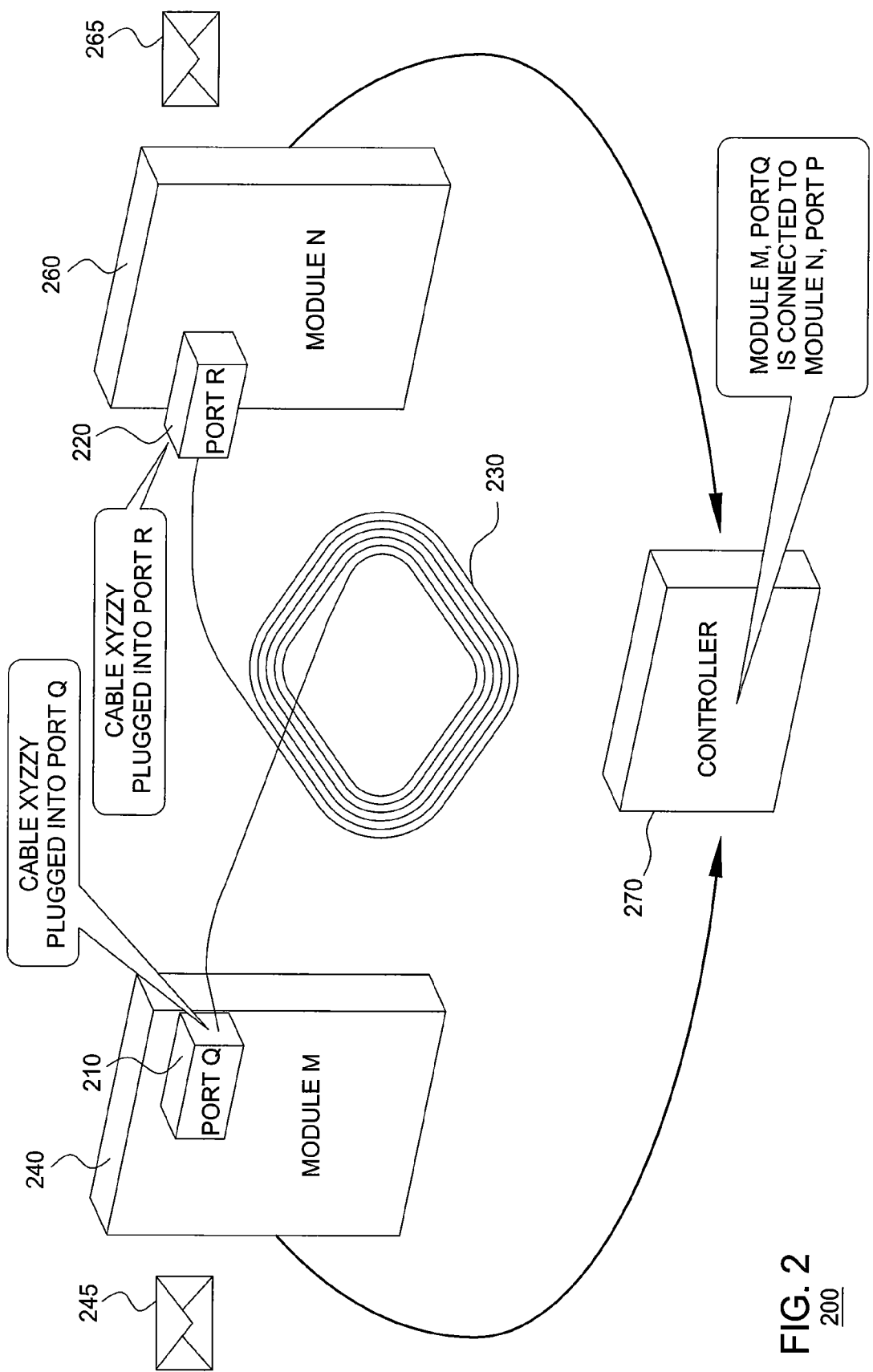
FIG. 2 depicts a high-level block diagram of a connection of components within a system according to one embodiment of the invention.

FIG. 2 depicts a high-level block diagram of a connection of components within a system according to one embodiment of the present invention. The system 200 includes a module M 240, a module N 260, and a controller 270.

The module M 240 includes a plurality of receptacles or ports including a receptacle or port Q 210 for connection to a labeled optical fiber. The module N also includes a plurality of receptacles or ports including a receptacle or port P 220 for connection to the other end of the optical fiber. An electronically labeled optical fiber 230 is inserted between the ports of module M (port Q) and module N (port R) to connect the two modules.

In one embodiment, the module ports include sensors for identifying and reading information associated with the electronic label (e.g., a serial number). In another embodiment, module equipment coupled to the port at each end of the fiber accesses the label device and reports the label to a program (not shown) being executed within the module. In a further embodiment, the module equipment reports the information to specialized hardware such as an application specific integrated circuit (ASIC) or a field programmable gate array (FPGA).

In a further embodiment, the module equipment sends a message to the controller 270. Illustratively, module M 240 send a message 245 to the controller notifying the controller that a optical fiber with label XYZZY has been plugged into port Q 210, and module N 260 sends a message 265 to the controller notifying it that a optical fiber with label XYZZY has been plugged into its Port P 220. In a further embodiment, additional information is provided with the serial number at the label such as the length of the optical fiber, attenuation of the signal, dispersion characteristic, core diameter, supported modes of transmission, manufacturer, etc.

The controller 270 discovers in this manner which modules and ports are interconnected without any data entry by the fiber optic cable installer. The controller 270 also maintains an inventory of the labeled optical fibers. The controller 270 receives the messages 245 and 265 from the respective modules 240 and 260. By analyzing these two messages, the controller determines that Module M 240, Port Q 210 is connected to Module N 260, Port P 220.

Figure 3:
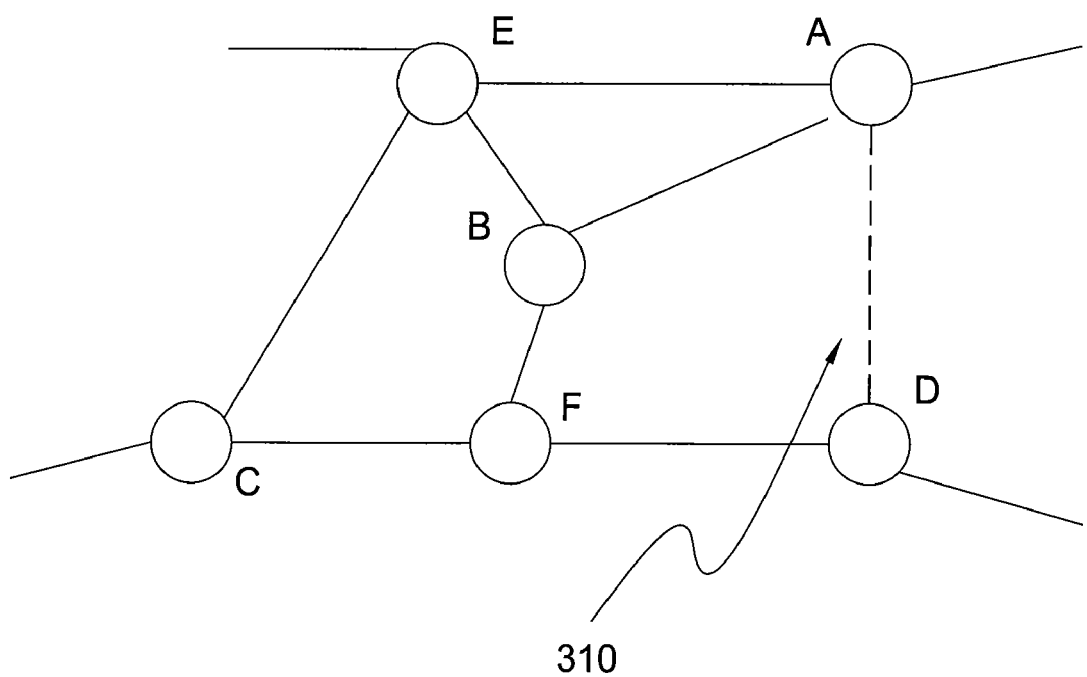
FIG. 3 illustrates a high-level network diagram of a connection of components between systems according to one embodiment of the invention.

A management system associated with a network element may identify the specific network element ports interconnected by an optical fiber by identifying those network element ports terminating the same optical fiber (i.e., those ports terminating an optical fiber having the same identifier). Where an optical fiber is terminated by ports within network elements managed by different management systems, messages between the management systems may be used to establish the actual network element port interconnections for an optical fiber. Thus, in one embodiment, an optical interconnection method includes receiving, at a network element, a message indicative of a port and optical cable associated with a desired interconnection, retrieving an identifier from an electronic labeling device associated with an optical cable coupled to a port, and determining whether the optical cable associated with the desired interconnection is connected to a port associated with the desired interconnection FIG. 3 illustrates a high-level network diagram of a connection of components between systems according to one embodiment of the present invention.

The network 300 includes a plurality of systems A-F. In one illustrative embodiment, system A is connected via connections to system E and system B. System B is connected to system E, system F and system A. System C is connected to system E and system F. System D is connected to system F. System E is connected to system A, system B and system C. System F is connected to system B, system C and system D. In another embodiment, each system is connected to additional systems (not shown). In one embodiment, a connection 310 is added between system A and system D. The connection is made using the electronically labeled optical fiber as described above. System A and system D communicate to agree upon the connection and then advertise the new connection to the network community to provide new bandwidth for connections.

Figure 4:
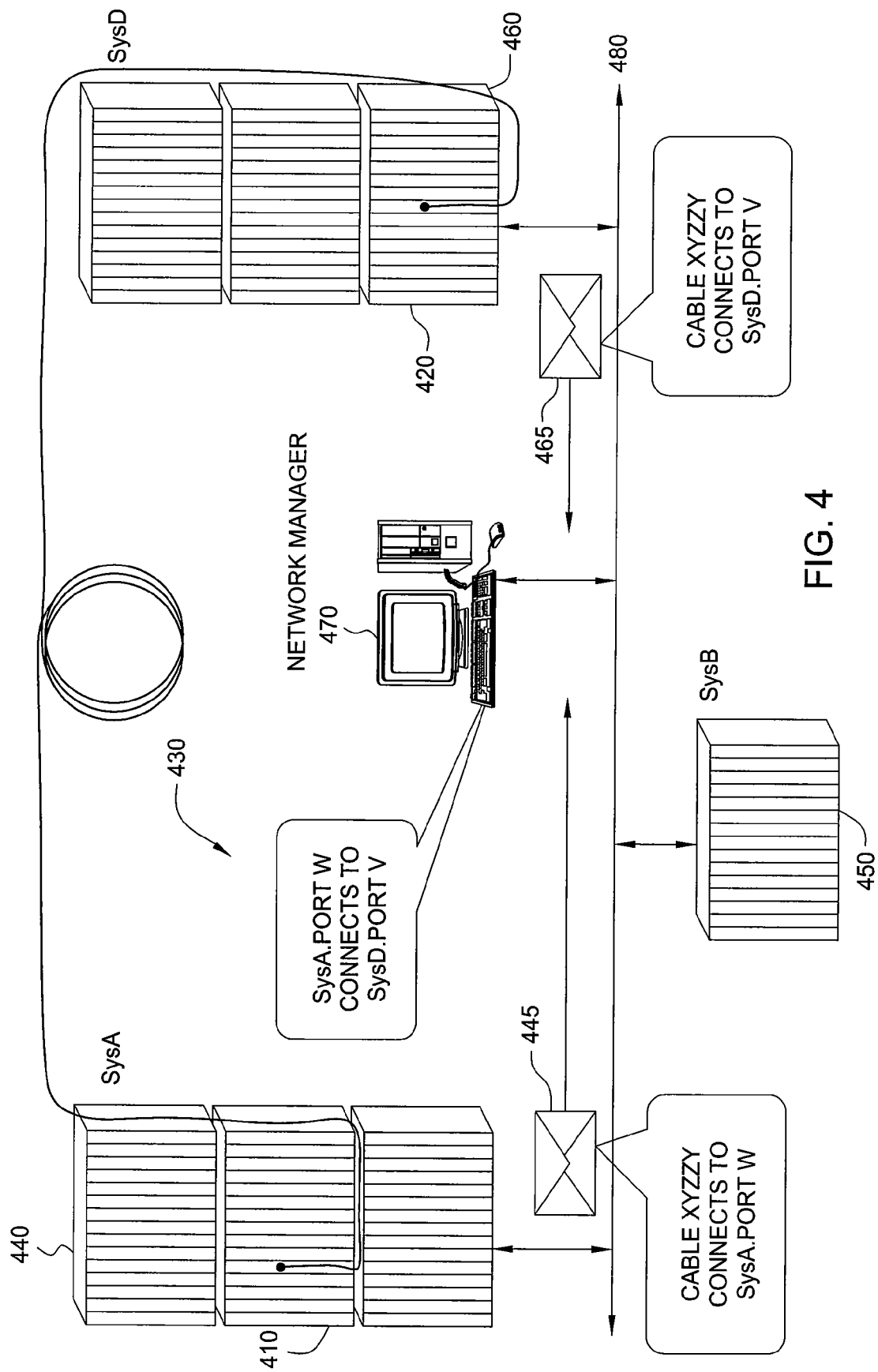
FIG. 4 depicts a high-level block diagram of a connection of components between systems according to an embodiment of the invention.

FIG. 4 depicts a high-level block diagram of a connection of components between systems according to one embodiment of the present invention. FIG. 4 illustrates the system level details of the connection depicted in FIG. 3.

The network 400 includes system A 440, system B 450, system D 460, and a network manager 470. The systems A, B and D as well as the network manager 470 are connected via a control communications network 480. Various components such as the network manager 470 are implemented as computing devices including processor, memory, mass storage devices, input/output devices and the like as is known to those skilled in the art. The various network elements managed may also include computing devices, which operate to achieve the various functions described herein.

System A 440 functions substantially similar to module M 240. In one embodiment, System A and System D both have the capability to read the electronic labels and have agreed to exchange information about those electronic labels to establish connections. System A 440 includes a port 410 for the insertion of a connector with the electronic label form the optical cable 430. In one embodiment, the optical cable includes the optical fiber 100. In another embodiment, the optical cable includes additional components and information in the label. Upon receiving the connector, system A reads the label and identifies the port that the connector is located. After the association is complete, a message 445 is sent to the network manager via the network connection 480. The message notifies the network manager that, illustratively, cable XYZZY 430 is connected to system A at port W 410.

System D functions substantially similar to the module N260. System D includes a port 420 for the connection of the optical cable 430. Upon connecting with the optical cable through port 420, system D reads the label of the cable and identifies the port. After the association, a message 465 is sent to the network manager 470 via the network connection 480. The message 465 notifies the network manager 470 that cable XYZZY 430 is connected to system D at port V 420.

The network manager 470 receives the messages 445 and 465 and determines that cable XYZZY 430 is connected on one end port W at system A and at the other end port V at system D, without data entry from the technician applying the fiber optic connection. Rather than relying upon a telecommunications craft worker to properly connect and verify the connection, the system can sense and report the applied connections.

While not shown in detail, each of the optical processing modules, systems and port supporting devices described above optionally includes an internal switching capability that enables routing of an optical signal from any input port to any output port or other processing function without regard to the wavelength of the signal. This switch may comprise any known switching architecture.

Figure 5:
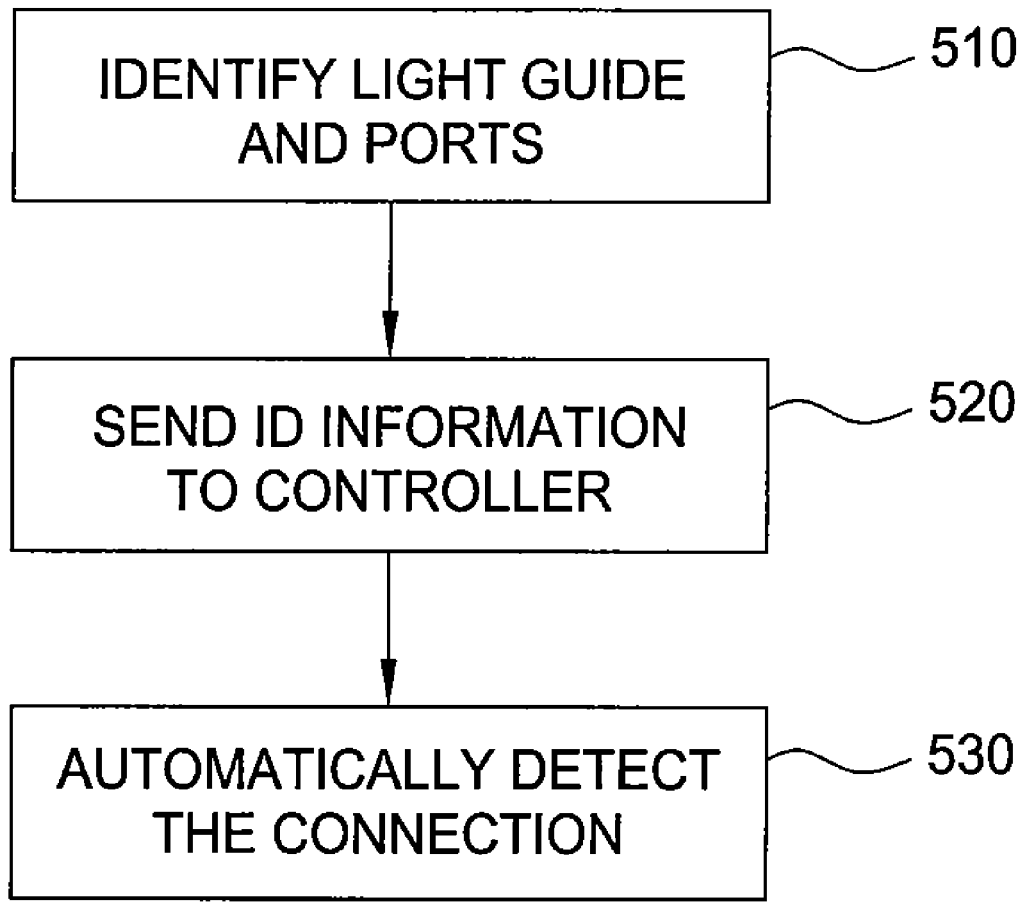
FIG. 5 depicts a flow chart of a method according to an embodiment of the invention.

FIG. 5 depicts a flow chart of a method according to an embodiment of the invention. Specifically, the method 500 of FIG. 5 is adapted to enable the automatic detection and connection/routing of optical signals provided by, for example, an optical cable identified via the electronic labeling techniques described herein.

Within one embodiment, a connector or terminator including an electronic labeling device is interrogated by, for example, a network element having a port adapted to receive the optical cable. The interrogation (e.g., transmission to the port of cable identifier and/or other information) yields information useful in verifying that the correct optical connection is being made to a port of a module. Alternatively, the information is useful in adapting the internal operation of the module (e.g., by switching the input signals as necessary) such that appropriate optical signal paths are provided. By reading the label and automatically associating the two ends of a optical fiber, the invention reliably informs the software or hardware system of the presence of a physical interconnection between the two endpoints. In one embodiment, the two endpoints are located within a domain of the system as in FIG. 2.

At step 510, each module identifies the optical fiber that is inserted into the port. The module also identifies the port that the optical fiber is plugged into.

At step 520, each module transmits the identification information of the cable and port to a controller. In another embodiment, additional information about the connection is transmitted.

At step 530, the controller automatically detects the connection. In one embodiment, software is use to identify the ports that are connected to the same cable. In another embodiment, hardware components are used.

Figure 6:
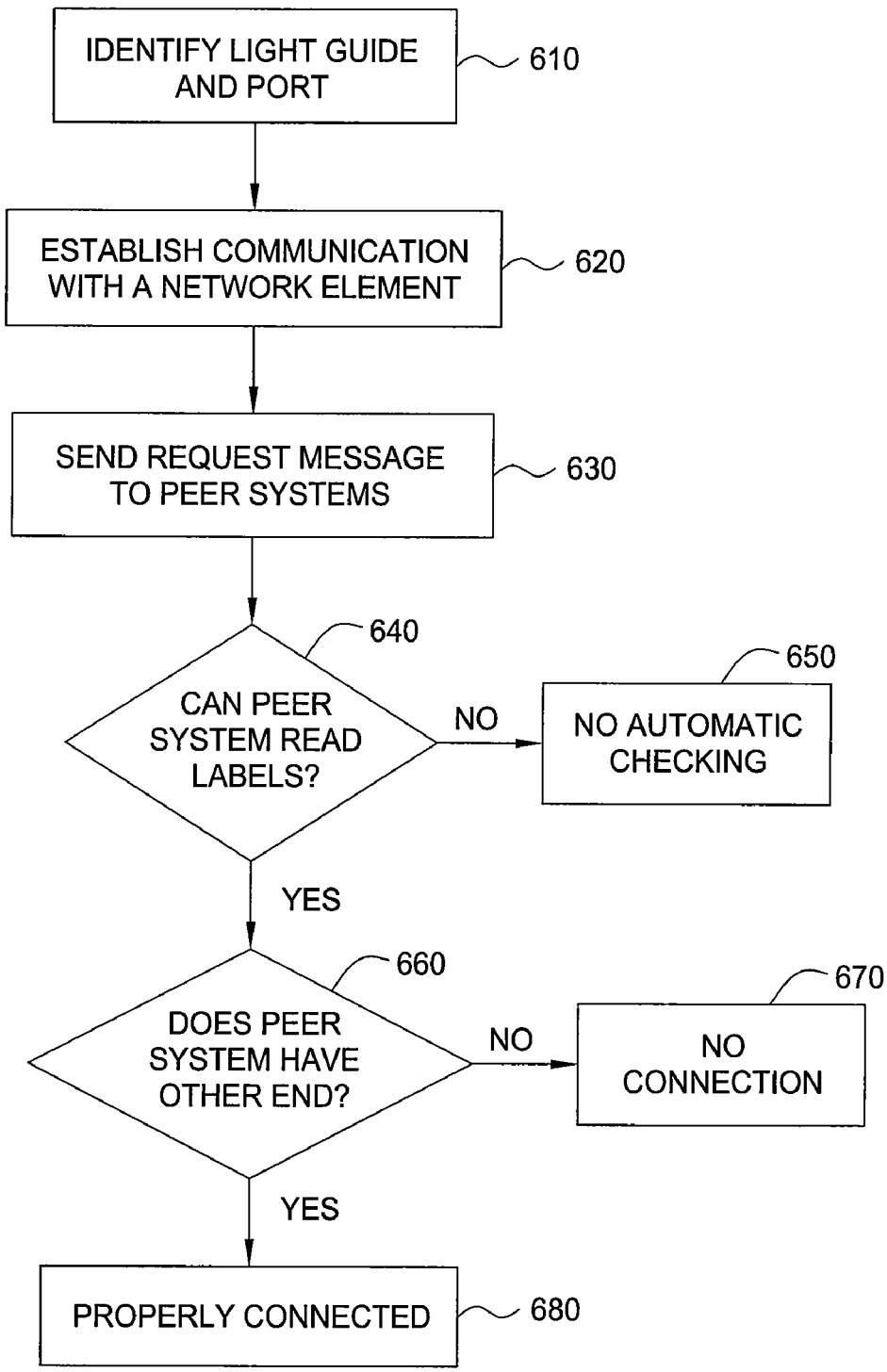
FIG. 6 depicts a flow chart of a method according to an embodiment of the invention.

FIG. 6 depicts a flow chart of a method according to an embodiment of the invention. The method 600 of FIG. 6 is directed to a connection between two separate systems or domains. If the endpoints reside in two separate software or hardware control domains, the electronic label is used to automatically discover physical optical fiber connections between two network elements using a simple protocol as shown in FIG. 4.

At step 610, a system identifies the optical fiber and the port that it is connected to at the system.

At step 620, the communication is established with a peer system or another network element such as a network manager. In one embodiment, the network manager can be distributed and located within each system. In another embodiment, the network manager is centralized and located separate from the systems.

At step 630, the system sends a request message to the peer system or another network element regarding the electronic label information. The request message includes the identification of the optical cable and the port ID. After establishing communication with a peer system, the system at one end of the labeled optical fiber can ask the peer system if it has the other end. In one embodiment, the request message includes additional information that is stored on the electronic labels.

At step 640, the peer system receives the message and responds with a message notifying the sending system whether or not it is able to read electronic labels. If the peer system is not able to read electronic labels, then the peer system replies that it has no means of reading light labels and that information is forwarded to the sending system. Therefore, no automatic checking of the connection occurs 650. If the peer system is capable of reading electronic labels, then it continues to step 660.

At step 660, the peer system determines if it has means to read, but does not have a connection with that cable, or that it has the means to read labels and it has found the other end attached to a specific port within its domain of control. By having the cable label information, the peer system can easily check if the same serial number exists in its database or memory. If the serial number does not exist, the peer system using its software or hardware components determines there is no connection 670. In one embodiment, if it does not have the other end of the cable, the peer system will send a return message notifying the sending system of this fact. In another embodiment, the peer system does not send a message so as to prevent congestion within the network. Only the peer system that has the other end sends a message. If the serial number is found within its database or memory, then the cable is connected with its system 680.

At step 680, a message including the label and port ID as well as other information is sent to the sending system. Thus, this message notifies the systems of the connection of the cable. In another embodiment, a distributed network manager is used. The network manager receives the messages from the sending system and the peer system and matches the serial numbers and associate the matches with the port ID. Thus, the connections are determined by the network manager similar to above.

The invention can be extended to encompass other passive optical components by differentiating some of the extended fields of the electronic labeling device. In this way, the fiber connections of circulators, asymmetric optical splitters, optical multiplexers and demultiplexers with "colored" optical ports and other such passive optical components could be individually identified and read by automated manufacturing test equipment to ensure the proper assembly of passive optical components.

Embedding the label and the sensors in the connector system ensures that the connections are accurately reported and requires less effort by the service technician. Attaching a secondary cable to an electronic label does not preclude inconsistent connections for the fiber and the label leading to errant results. The extra cabling also presents extraordinary cable handling challenges in high-density connector arrays. Reducing the connection errors by instant auditing of the connections, and providing accurate connectivity and fiber type information to the software systems are the primary benefits of the invention. The difference between a broken or degraded fiber and the absence of a fiber can now be determined by the system software, whereas currently the two faults can not be differentiated by software and must be determined by visual inspection of high density connector fields with scant room for visual labels.

As noted previously, an element management system (EMS) may be provided with data indicative of the port connections of identified optical cables. For example, modules cooperating with electronically labeled cables may identify the particular cables using the serial number or other identifier. This information may be provided directly to the EMS or additionally processed by the module control circuitry and/or software. In the case of software or programming adapted to achieve various functions such as described herein, such programming is performed using a controller in which a program stored in a memory is retrieved therefrom and executed by a processor to achieve the desired function. Input/output (I/O) circuitry is used by the processor to control other circuitry and thereby achieve the various functions per the program. This controller topology may be implemented in an electronic labeling device associated with an optical cable, a module communicating or otherwise cooperating with the optical cable, a central or distributed control element and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. An optical interconnection method for providing new bandwidth for interconnected systems or domains, comprising:
    identifying a light guide and a first port associated with the light guide, the first port connecting the light guide to a first system;
    propagating a message comprising an electronic label information associated with the light guide and an interrogation to determine a location of a second port associated with the light guide at a second system;
    receiving a message, the message containing identification related to the second port location at the second system and label and port identification of the light guide thereby discovering a connection, and
    advertising the connection to the interconnected systems to thereby provide new bandwidth for connections.

2. The optical interconnection method of claim 1, wherein communication is established with a peer system or another network element.

3. The optical interconnection method of claim 2, wherein the other network element is a network manager.

4. The optical interconnection method of claim 3, wherein the network manager is distributed and located within each system.

5. The optical interconnection method of claim 3, wherein the network manager is centralized and located separate from the first and second systems.

6. The optical interconnection method of claim 1, wherein the request message includes additional information stored on the electronic labels.

7. The optical interconnection method of claim 1, wherein the peer system sends a return message notifying a sending system that the other end of the cable is not located at the peer system.

8. The optical interconnection method of claim 7, wherein the peer system does not send a message to thereby prevent network congestion.

9. The optical interconnection method of claim 8, wherein the peer system at the other end sends a message.

10. An optical communications network, comprising:
    means for identifying a light guide and a first port associated with the light guide, the first port connecting the light guide to a first system;
    means for propagating a message comprising an electronic label information associated with the light guide and an interrogation to determine a location of a second port associated with the light guide at a second system;
    means for receiving a message, the message containing identification related to the second port location at the second system and label and port identification of the light guide thereby discovering a connection, and
    means for advertising the connection to the interconnected systems to thereby provide new bandwidth for connections.

* * * * *